(12) United States Patent
Beth et al.

(10) Patent No.: US 11,209,816 B2
(45) Date of Patent: Dec. 28, 2021

(54) AUTONOMOUS LONG RANGE AERIAL VEHICLES AND FLEET MANAGEMENT SYSTEM

(71) Applicant: Above Daas, Inc., Phoenix, AZ (US)

(72) Inventors: Dirk Karsten Beth, Phoenix, AZ (US); Austin Jess Burch, Austin, TX (US)

(73) Assignee: Above Daas, Inc., Phoenix, AZ (US)

( * ) Notice: Subject to any disclaimer, the term of this patent is extended or adjusted under 35 U.S.C. 154(b) by 211 days.

(21) Appl. No.: 16/258,040

(22) Filed: Jan. 25, 2019

(65) Prior Publication Data

US 2019/0235488 A1 Aug. 1, 2019

Related U.S. Application Data

(60) Provisional application No. 62/622,523, filed on Jan. 26, 2018.

(51) Int. Cl.
*G05D 1/00* (2006.01)
*G05D 1/10* (2006.01)
*B64C 39/02* (2006.01)

(52) U.S. Cl.
CPC .......... *G05D 1/0027* (2013.01); *B64C 39/024* (2013.01); *G05D 1/101* (2013.01); *B64C 2201/126* (2013.01); *B64C 2201/146* (2013.01)

(58) Field of Classification Search
CPC ...... G05D 1/0027; G05D 1/101; G05D 1/104; B64C 39/024; B64C 2201/126; B64C 2201/146; B64C 2201/021; G08G 5/0039; G08G 5/0056; G08G 5/0013; G08G 5/0026; G08G 5/0008; G08G 5/0043; G08G 5/0069

See application file for complete search history.

(56) References Cited

U.S. PATENT DOCUMENTS

| | | | | |
|---|---|---|---|---|
| 7,706,979 | B1* | 4/2010 | Herwitz | G08G 5/045 701/301 |
| 2017/0083979 | A1* | 3/2017 | Winn | H04L 67/32 |
| 2017/0154536 | A1* | 6/2017 | Kreiner | G06Q 10/00 |
| 2017/0193556 | A1* | 7/2017 | Sham | G06Q 30/0265 |
| 2017/0235316 | A1* | 8/2017 | Shattil | H04B 7/18504 701/3 |
| 2018/0004207 | A1* | 1/2018 | Michini | G08G 5/0069 |
| 2019/0075293 | A1* | 3/2019 | Lim | H04N 19/61 |
| 2019/0202568 | A1* | 7/2019 | Borup | B64D 15/12 |

* cited by examiner

*Primary Examiner* — Peter D Nolan
*Assistant Examiner* — Ashley L Redhead, Jr.
(74) *Attorney, Agent, or Firm* — GTC Law Group PC & Affiliates (57) ABSTRACT

Autonomous airship fleet operation includes receiving a mission request. A fleet manager in response to receipt of a mission request, plans a mission having a corresponding mission path and corresponding mission tasks based on a vehicle occupancy map. The fleet manager selects one or more candidate vehicles for the mission based on a correlation of at least one vehicle capability to a capability requirement determined from the mission request. The fleet manager further coordinates operation of the selected vehicles for a duration of the mission request, thereby fulfilling the at least one mission objective of the mission request.

20 Claims, 7 Drawing Sheets

AUTONOMOUS LONG RANGE AERIAL VEHICLES AND FLEET MANAGEMENT SYSTEM

CLAIM TO PRIORITY

This application claims the benefit of U.S. provisional patent application Ser. No. 62/622,523, titled "Autonomous Long Range Airship" and filed Jan. 26, 2018, which is hereby incorporated by reference in its entirety.

BACKGROUND

Field

The methods and systems described herein generally relate to management and operation of a fleet of autonomous long range aerial vehicles (also referred to as an airship or a dirigible) for numerous different applications such as inspection of a forest area, an electric distribution system, a pipeline, or the like.

SUMMARY

In embodiments, methods and systems for autonomous airship (e.g., aerial autonomous vehicles) fleet operation may include a method for planning and executing missions that may include receiving, by a fleet manager, a mission request. The fleet manager may be a digitally controlled system, such as a computer configured for planning and executing missions with autonomous airships, such as those arranged in a fleet as described herein. The request may be received from a user, through a user device, such as a computer and the like, the user may be an end user of a service provided by the fleet, such as a business owner, preventive maintenance specialist and the like. In embodiments, the method may include the fleet manager determining a mission plan having a corresponding mission path and corresponding mission tasks. The fleet manager may determine the mission play in response to receipt of the mission request. In embodiments, the method may include determining one or more vehicles of a fleet of aerial autonomous vehicles to perform the corresponding mission tasks. The mission path and mission tasks may be divided into segments performed by different vehicles of the fleet. In embodiments, a single vehicle may perform all segments of a task or multiple tasks. In embodiments, the method may further include the selected one or more vehicles performing the corresponding mission tasks or portions thereof. Further in the method, the one or more vehicles determined for performing the corresponding mission path and/or segment thereof may be configured with image acquisition devices that maybe operated to acquire digital multi-dimensional data. In embodiments, the digital multi-dimensional data may be acquired digitally, such as from a computer memory and the like. The digital multi-dimensional data may correspond to a flight path and may be analyzed to detect, among other things, incidents relating to the mission which require a change, such as in the flight path and/or in a mission path to satisfy the mission plan. In embodiments, responsive to the incidents relating to the mission, the vehicle may adjust its flight path relative to a base flight path associated with the mission plan to capture additional, optionally higher resolution data, including multi-modal data such as heat-related data, electrical energy-related data, magnetic field-related data, air quality data, wind direction data and the like.

In embodiments, the method may further include broadcasting, such as by the fleet manager, the mission plan to each vehicle of the fleet, or at least to a subset of vehicles in the fleet based on a best fit criteria for vehicle selection. The method may include the fleet manager receiving, responsive to the broadcast, a corresponding communication from each of at least some vehicles of the fleet indicating an ability and/or enthusiasm of the responding vehicle to perform one or more mission tasks of the mission. In embodiments, a selecting step may also be performed to determine the vehicles to perform the corresponding mission tasks based on the corresponding communications. The corresponding communication from each of at least some vehicles of the fleet represent an enthusiasm of the vehicle to perform the one or more mission tasks.

In embodiments, methods and systems for autonomous airship (e.g., aerial autonomous vehicles) fleet operation may include a method planning and executing missions including receiving, by a fleet manager, a mission request from an end user. The method may further include determining, by the fleet manager in response to receipt of a mission request, a mission plan having a corresponding mission path and corresponding mission tasks. The method may further include broadcasting, by the fleet manager, the mission plan so that each vehicle of the fleet may have access to at least a portion of the mission plan via the broadcast. Ye further the method may include receiving, by the fleet manager, a corresponding communication from each of at least some vehicles of the fleet indicating an ability of the vehicle to perform one or more mission tasks of the mission, wherein the corresponding communication from each of at least some vehicles of the fleet represent an enthusiasm of the vehicle to perform the one or more mission tasks. The method may also include selecting, by the fleet manager, one or more vehicles of a fleet of aerial autonomous vehicles to perform the corresponding mission tasks, wherein the mission path and mission tasks may be divided into segments performed by different vehicles of the fleet; wherein the selecting step is performed to determine the vehicles to perform the corresponding mission tasks based on the corresponding communications. Also in the method, the selected one or more vehicles may perform the corresponding mission task. In this method, the determined one or more vehicles for performing the corresponding mission path are enabled to acquire digital 2D data corresponding to a flight path, analyze the acquired digital 2D data to detect incidents relating to the mission which require a change in a mission path. Yet further in this method, the selected one or more vehicles are enabled to detect incidents relating to the mission which require additional data acquisition. Also, in the method, the selected one or more vehicles are enabled to perform edge processing, which may further comprise reducing, by one of the selected one or more vehicles, an acquired data set, and transmitting a resultant reduced data set to a cloud platform, which may transmit the resultant reduced data set to an end user. In embodiments, the one of the selected one or more vehicles determines an amount, a selected channel over which to transmit the resultant reduced data set to the cloud platform, and a timing for the transmission.

In this method, one of the selected one or more vehicles communicates with another vehicle of the fleet to offload a mission task to the other vehicle. Yet further the selected one or more vehicles are enabled to detect incidents relating to the mission which require additional data acquisition and optional processing using, for example a neural network for both determining which data to acquire and/or processing the acquired data and the like. In embodiments, the method may further include capturing images by the selected one or more vehicles, analyzing the captured images to detect an event indicative of a need for additional information, adjusting a path of the vehicle to facilitate capture of images from a plurality of perspectives of the detected event, and capturing additional images, wherein a controller of the vehicle performs the analyzing and adjusting.

In embodiments, methods and systems for autonomous airship (e.g., aerial autonomous vehicles) fleet operation may include a method for operating a plurality of autonomous flight vehicles. Such a method may include receiving, by an autonomous flight vehicle fleet manager, a mission request from an end user, the mission request including at least one mission objective. Such a method may further include determining, by the fleet manager in response to receipt of a mission request, a mission plan having a corresponding mission path and corresponding mission tasks, the mission plan being determined based on autonomous flight vehicle information from a vehicle occupancy map, the autonomous flight vehicle information including data descriptive of a plurality of vehicle capabilities. Such a method may further include selecting, by the fleet manager, one or more candidate vehicles of a fleet of vehicles to perform at least one of the corresponding mission tasks, wherein at least one vehicle capability of the one or more candidate vehicles corresponds to a capability requirement determined from the mission request. In embodiments, such a method may further include coordinating operation of the selected one or more vehicles for a duration of the mission request, thereby fulfilling the at least one mission objective of the mission request.

BRIEF DESCRIPTION OF THE FIGURES

The disclosure and the following detailed description of certain embodiments thereof may be understood by reference to the following figures.

DETAILED DESCRIPTION

Figure 1:
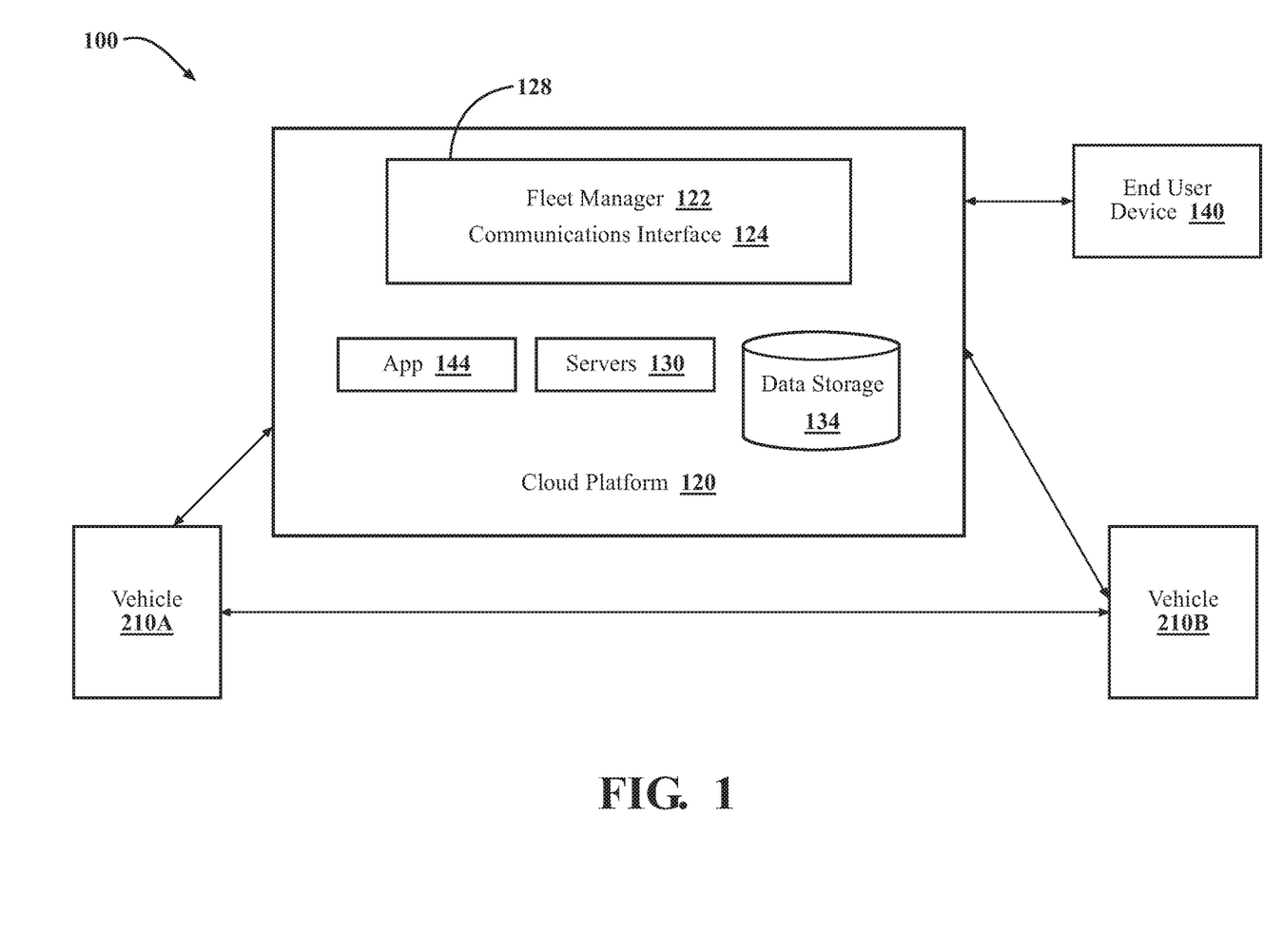
FIG. 1 depicts an embodiment of a system for organizing, including mission planning, and operating a fleet of dirigible-type unmanned autonomous airborne vehicles.

FIG. 1 depicts an exemplary system 100 for planning and performing various missions, such as inspection and documentation missions, using a fleet of long range, lighter than air autonomous aerial vehicles, depicted in FIG. 1 as vehicle 210A and vehicle 210B. In embodiments, the system 100 includes cloud platform 120, which is operable to perform mission planning for one or more vehicles of the fleet, including evaluation of a desired mission, determination of a mission plan, segmentation of the mission plan if needed, selection of one or more vehicles suitable for executing the mission plan, and assignment of various tasks and routes associated with the mission plan to one or more appropriate vehicles in order to allow execution of the desired mission.

In embodiments, the system 100 provides fleet management and collaborative mission tasking and is tailored to service long missions. While the vehicles may perform long endurance operations, the accessibility of an entire fleet allows for collaborative mission tasking. The cloud platform may include optimization algorithms to output mission metrics for the best route, number of vehicles, type of vehicles, mission segmentation and handoffs. The user may also input preferred settings such as an expedited mission completion, resulting in, for example more vehicles tasked to the particular mission.

The cloud platform 120 may be implemented via an Azure cloud system, and may include one or more servers 130, data storage 134, a central intelligence module 128 with a fleet manager 122 and a communications interface 124. Duties of the cloud platform 120 include communication with an end user for mission definition and end product data transmission. The fleet manager 122 communicates with vehicles 210A, 210B and segments the mission into tasks that may be distributed to different vehicles in order to organize performance of the mission in an efficient, safe, and effective manner. In embodiments, the vehicles of the fleet are each in communication with the cloud platform 120 via multiple network access points supporting various communication channels including, without limitation, short range WiFi, V2V (vehicle-to-vehicle) tethering, satellite, or 4G/LTE (or newer network technologies) communication. Such access enables the fleet manager 122 to communicate with and manage each vehicle with respect to one another, the missions at hand, and external impacts. The fleet manager 122 operates autonomously and may be closely monitored to ensure mission safety and accuracy. The central intelligence module 128 thus enables efficient mission deployment and segmentation, as well as other functions relating to maintenance, power sustainability, and testing for R&D of vehicles of the fleet.

The vehicles may operate as described in U.S. patent application Ser. No. 15/945,543, titled "Autonomously Operated Dirigibles" filed Apr. 4, 2018, the entirety of which is hereby incorporated by reference. The vehicles may include a combination of the hardware and software running unique algorithms to implement various tasks such as to determine enthusiasm for a mission plan or portion thereof, perform navigation, data acquisition, data processing, event recognition, updated path planning, hand-off of mission tasks, and data reporting, as described herein. Elements, methods, and systems described herein may include features and functionality in corresponding embodiments of the incorporated references.

The vehicles are enabled to communicate with the cloud platform 120, which includes an application 144 for receiving mission parameters from an end user, a communications interface 124 for communication with each vehicle of the fleet as well as other entities, and a fleet manager 122 for organizing a mission and assigning mission tasks to one or more vehicles. Each vehicle may also be enabled to communicate with the other vehicles. In embodiments, an end user may communicate via an end user device 140 with the system 100, or elements thereof, such as the cloud platform 120 to define, for example, a mission for implementation and execution by the system 100. In embodiments, the end user device 140 may be distinct from the system 100, may be incorporated with the system 100, and may be incorporated into the system 100.

Figure 2:
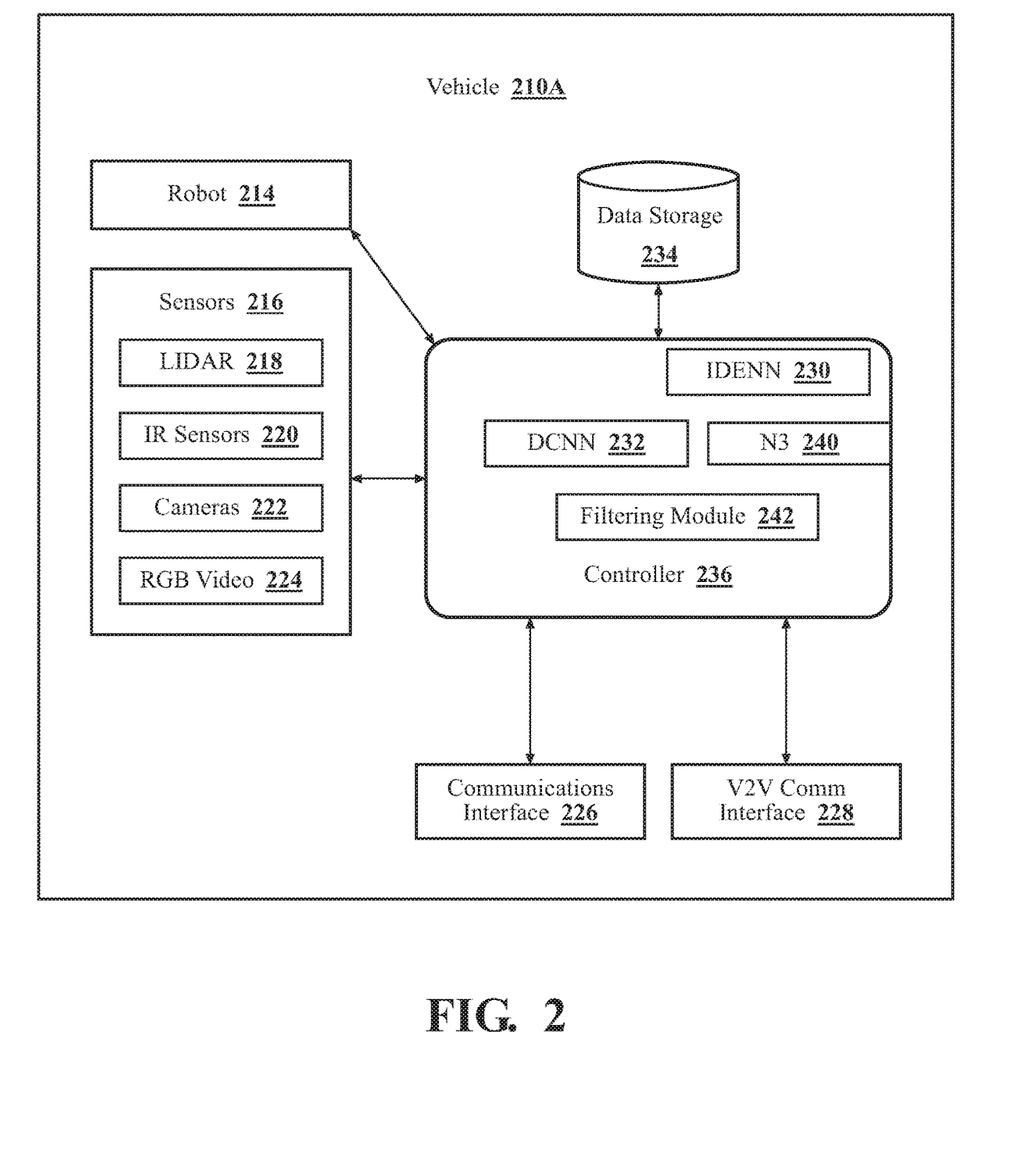
FIG. 2 depicts an embodiment of an autonomous vehicle.

FIG. 2 depicts exemplary components of vehicle 210A, 210B, which may include a robot 214, various sensors 216, a controller 236, data storage 234, a V2V communication interface 228, a communications interface 226 for communicating with the platform 120 and other external entities via one or more of various types of networks.

The vehicle controller 236 may include a processing element such as a GPU, floating point processor, AI accelerator and the like for performing vehicle and related data processing, including without limitation neural network real-time data processing. The vehicle may include other processing elements, such as a CPU for operations, such as sequencing and coordinating data, hosting an operating system, and the like. The vehicle data storage 234 may include non-volatile memory, such as solid state drives for storage (e.g., temporary, short term, long term, and the like) of captured data, uploaded data, data from other vehicles as well as storage of processed data. The sensors may comprise LIDAR 218, IR sensors 220, digital cameras 222, RGB or other video 234, and other sensors such as thermal, stereo, hyper or multispectral sensors, or any other 2D, 3D or other sensor, and the like, for data acquisition related to a mission and navigation of the vehicle.

The communication interfaces 226, 228 may include a high-speed data transmission connection interface (beyond the on-board connections) including USB, Ethernet, or the like for communicating with one or more other vehicles, the cloud platform, or other entities, as well as include components allowing for different types of data communication on different spectrum, which may include cellular data like LTE, WiFi, and proprietary systems such as iridium satellite connectivity. The V2V communication interface for vehicle to vehicle communication may also allow for real-time coordination between vehicles.

Figure 3A:
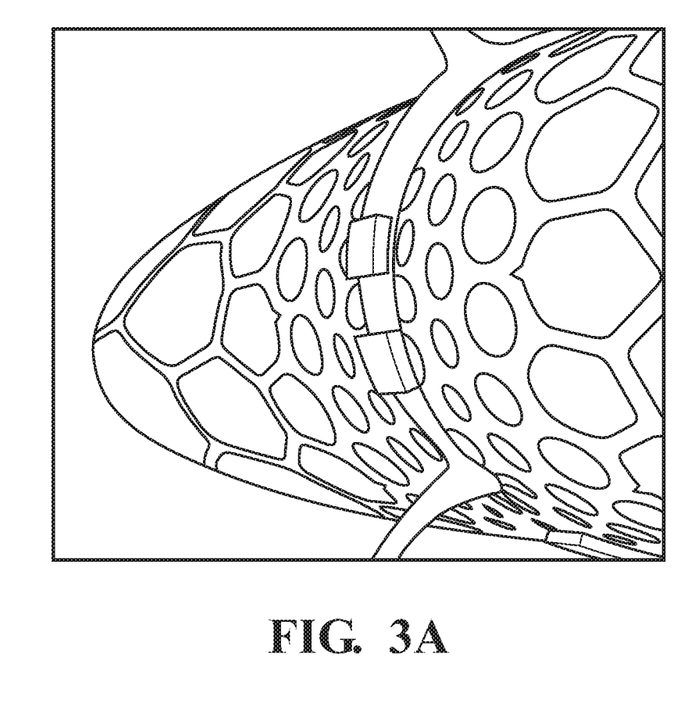
FIGS. 3a-b depict embodiments of sensors attached to a vehicle.
Figure 3B:
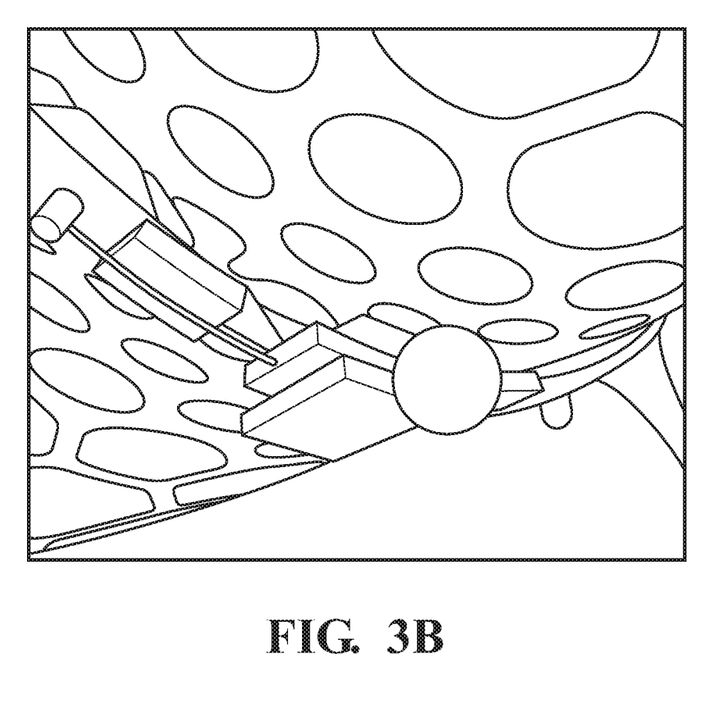

FIGS. 3a and 3b depict an exemplary airborne vehicle 210A with various sensors which allow for data acquisition with respect to the surroundings of the vehicle to be performed, including for example acquisition of 2D or 3D images of the earth and objects, typically below the vehicle, although such objects could appear at any orientation to the vehicle, such as above, in front of, alongside, and behind the vehicle as it navigates along a mission path.

Figure 4A:
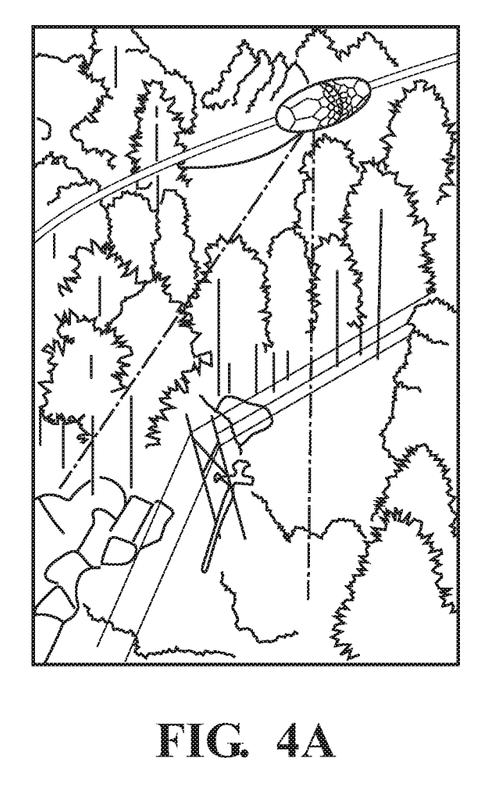
FIGS. 4a-b depict exemplary operation of a vehicle to detect an incident and modify a mission path.
Figure 4B:
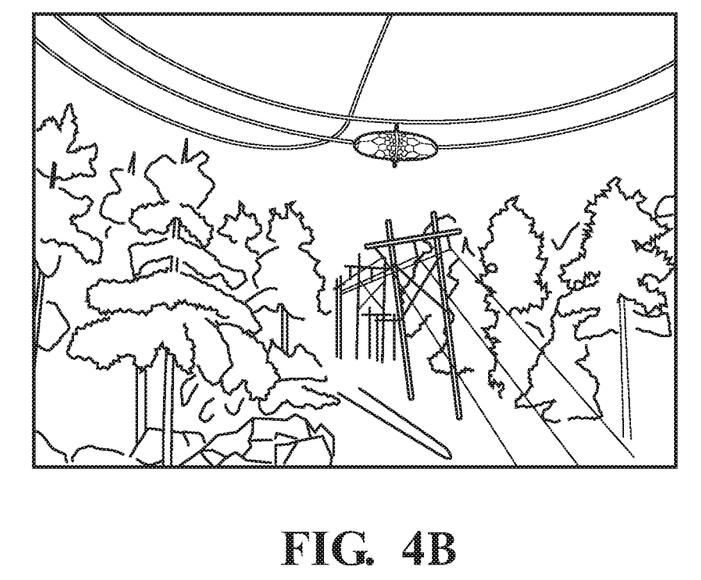

In embodiments, the vehicle's controller 236 includes processing capabilities that may include artificial intelligence (AI) to sense an issue during its mission and determine an appropriate path adjustment. This sensing may trigger automated path planning to create a more in-depth look at a suspected issue site. This may be an incident detailed examination (IDE) procedure which may entail planning a circular path around the site where the sensors are capturing data which may be used to determine if the issue is a real issue and/or may be used to provide the data to the end user documenting the issue. For example, FIG. 4a depicts a vehicle inspecting an electric distribution system and determining that a utility pole has fallen over. In reaction to this event, as shown in FIG. 4b, the vehicle collects additional data for the area surrounding the detected fallen utility pole, such as by moving closer and circling around the area to obtain data from additional viewpoints.

In embodiments, the vehicles 210A, 210B may include an incident detailed examination neural network (IDENN) 230, which may be used to detect relevant events and identify areas of interest relevant to a mission plan of the vehicle. The IDENN 230 may be enabled to quickly (e.g., in near real-time) and efficiently (e.g., using fewer processing cycles than existing technology) process the data generated from the vehicle sensors (e.g., digital cameras 222, LIDAR 218, IR sensors 220, and the like) and optionally from external sensors and/or data sources to detect issues during the vehicle's mission path. The IDENN 230 can trigger a modification of a planned mission path to provide a closer and/or more in-depth look at an identified issue. The IDENN 230 can then use the new data from the closer look to verify the issue, acquire more data if necessary, and create a data-capture report.

More specifically, in embodiments, upon determination of an incident or event, a data capture neural network (DCNN) 232 may be activated. The DCNN 232 may be used to provide a continuously improving data-capture that maximizes efficiency of the planned path geometry considering both the amount of data needed, the environmental conditions, and the optimal viewing angles of the sensors.

In embodiments, a navigation and path planning neural network (N3) 240 may facilitate autonomous operation of the vehicle and its component systems. N3 240 may provide the ability for the vehicles to safely integrate into the airspace while ferrying and conducting missions. N3 240 may receive external data from several sources, such as AirMap, NOAA, and the like, plus the mission requests from the cloud platform 120 to continuously plan and optimize routes.

N3 240 may receive communications from and transmit communications to other entities, such as air traffic control entities and/or other air traffic networks N3 240 may facilitate aborting or rerouting any mission due to weather or other issues. N3 240 may plan and route a maintenance grounding over the system 100. N3 240 may enable performance of emergency maneuvers based on input from sensors. N3 240 may enable performance of emergency maneuvers based on input from onboard maintenance systems. N3 240 may act to optimize missions based on efficiency of operation of onboard solar-electric system. N3 240 may act to optimize path using a combination of thrust, brake, wind speed, direction and altitude.

In embodiments, the vehicles 210A, 210B may be capable of carrying a heavier payload than prior art devices. This provides advantages not only with respect to allowing for more precise and accurate sensing, but also provides a greater capacity of computational power. A vehicle's increased onboard processing capability allows for computation on the edge (also known as edge processing, which refers to execution of aggregation of data from various sensors, data manipulation or other data processing on the vehicle), which enables the vehicle to make decisions in real-time and adapt to the vehicle's surrounding environment. Additionally, a vehicle's onboard artificial intelligence capability allows for continuously improvements in performance due to learning platforms for both data acquisition as well as navigation and path planning.

Edge processing allows a vehicle 210A, 210B to gather critical data relating to a mission by fusing the feeds of multiple disparate sensors while using neural networks to process a data feed in real-time for incident/event detection or classification. Incorporated on top of the vehicle's onboard real-time controller 236 is the main CPU integrated sensor feed data. Processing acquired data in real-time and determining critical (red-flagged) events may trigger further investigation and data acquisition. Furthermore, the ability to process data onboard the vehicle allows for a reduced dataset of relevant information to be provided to the cloud server and ultimately to an end-user. Unlike other prior art remote sensing systems that send all data for post-processing to a remote location, the system 100 with vehicle on the edge processing (e.g., processing the data with processing elements of the vehicle 210A, 210B) of data acquired via the on-board sensors and on-board neural networks allow for important functionality and advantages.

This functionality may include an ability to react to information in the real world to identify an area of interest to adaptively change a mission path in order to gather further information through sensor data capture on an identified area of interest, independent of network access to the cloud platform 120 or other vehicles and the like. In an example, the type and amount of captured or processed data to retain for the benefit of the end-user may be identified by a vehicle, as well as identifying the data to be eliminated. A mission path may also be modified to take into account an unforeseen obstacle. Mission path planning may attempt to minimize off path capture and seek to route such that image capture is less optimal rather than disjointed (as may be the case with blackout areas along the mission path, which would be void of sensor data). An ability to convert heavy weight data such as point cloud or high resolution video information into light-weight vector based metadata is also provided.

Advantages to this functionality include reducing a burden of post processing large amounts of data, which may take lots of human time and/or computer resources. Further, the amount of bandwidth required to send data from the vehicle 210A, 210B to the cloud platform 120 may be reduced. The mission efficiency and vehicle safety may be increased, wherein vehicle safety may refer to overall perception confidence and redundancy. A world model including obstacle and asset placement and description may be achieved with such a system, which may then be shared to all the vehicles in the fleet.

As an example, in an application such as a wide area forest inventory project, the use of remote sensing coupled with edge processing allows for the system to be able to take a variety of individual tree characteristics and convert them to geo-referenced metadata. This information can include tree species, canopy height, canopy area, canopy base, trunk diameter, trunk taper, trunk straightness, and overall foliage. In addition to inventory data, sensors can collect additional data such as health and hydration of the forest. This data can also be distilled into geo-referenced metadata.

In embodiments, the vehicles may operate in remote areas without landing for long periods of time. Thus, at times access to data networks may be limited. Although the vehicles may have several communication capabilities on a variety of networks, it is important that the vehicles have the ability to determine what to send and when. The factors that determine this may include the criticality of the data to send and receive as well as information regarding what data networks are currently available. In an example, critical navigation related information may transmit as needed over a more expensive and lower bandwidth network, while larger data sets relating to captured data may wait until a higher-bandwidth and more cost-effective network became available. Furthermore, typically end-users may not have the ability to make use of very large datasets so it may be desirable to decrease the amount of data provided to an end user.

Thus, the vehicle may include an intelligent data filtering module 242, which acts to determine which dataset to provide as useful information to the end-user, which is important for the vehicle autonomy perception, and determining which data should be added to various training sets shared amongst vehicles. In embodiments, the data filtering module 242 may compare stored data on the vehicle to the available current or expected bandwidth on available spectrum in order to determine how much and what types of data to send. The vehicle may classify data in order to prioritize the data to transmit. This includes during mission and transit opportunities. Mission path planning also may incorporate the need to transmit data and network availability.

For example, in the case of a mission relating to electric distribution system inspection, the vehicle 210A may determine whether to simply notify the end-user that there is an issue, the type, and the location of the issue, or to more comprehensively notify the end-user that there is an issue and send all the related sensor data related to the incident. In another example, for an application involving a wide area forestry inventory survey, the system 100 and/or vehicle 210A may determine the amount of ground area vector data to provide over a determined mode of communication or bandwidth. Determination of network connectivity and transmission load may be incorporated in the vehicle's processing intelligence. The ability to process and communicate outputs in real-time enable the vehicle to operate autonomously, without a supervisor.

The vehicle 210A, 210B may continually update a 3D map of available communication channels to help anticipate when and where data can be transmitted back to a cloud server of the cloud platform and shared with other vehicles. Such a map may be used in path planning along with many other variables including such variables as weather, location of other vehicles, on the like.

In embodiments, a customer facing application 144 of the system 100 includes a supporting set of AI algorithms that helps an end user to easily plan missions. The process may be as follows: A user selects a geographical spot, such as any point on the globe. The system software, using several inputs, determines the possible types of missions possible in that area. The application 144 may automatically set the mission parameters for the mission based on a determined mission type. This may include the mission scope, sensors required, altitude of the vehicle, and the like. The user may provide additional inputs to further configure the mission. For example, a user may select the mission type if several are presented, set the scope of the mission, adjust or change mission parameters such as sensor settings, and the like. In this manner, many possible inputs for the decision making process may be enabled by the application 144.

In embodiments, satellite images, such as those provided by third-party mapping systems (e.g., GOOGLE maps, and the like) may be accessed for data corresponding to the specified location. These could be used to determine if there is a field, pipeline, forest, or the like at the site. Contextual information from the mapping systems and collaborative sources could be used to determine the boundaries of the mission. Past missions of the user or other users could also be used. Other relevant sources could be used to extend and improve the automatic mission planning as well.

The system 100 with cloud platform 120 are tailored to service long missions. This includes selecting vehicles with capabilities specific to long missions, as well as an intelligent centralized mission planning system to segment missions. The ability to communicate in real-time to an entire fleet over a dispersed area allows for collaborative mission tasking. The cloud platform may also include optimization algorithms to output mission metrics for the best route, number of vehicles, type of vehicles, mission segmentation and handoffs, a need to transmit data to the cloud platform, and network availability. An end user may also input preferred settings such as an expedited mission completion, resulting in more vehicles tasked to a particular mission. Segmentation points may be distinctly represented when idle times become high for a particular vehicle, and other vehicles may offer to 'lend a hand' in aiding a mission. Further segmentation points may be triggered during times of close proximity of vehicles for the mission, excessive red-flagged events generating an adapted mission profile, saddle points in weather gradients, or distribution of tasks for larger or redundant missions best suiting for multiple vehicles.

Figure 5:
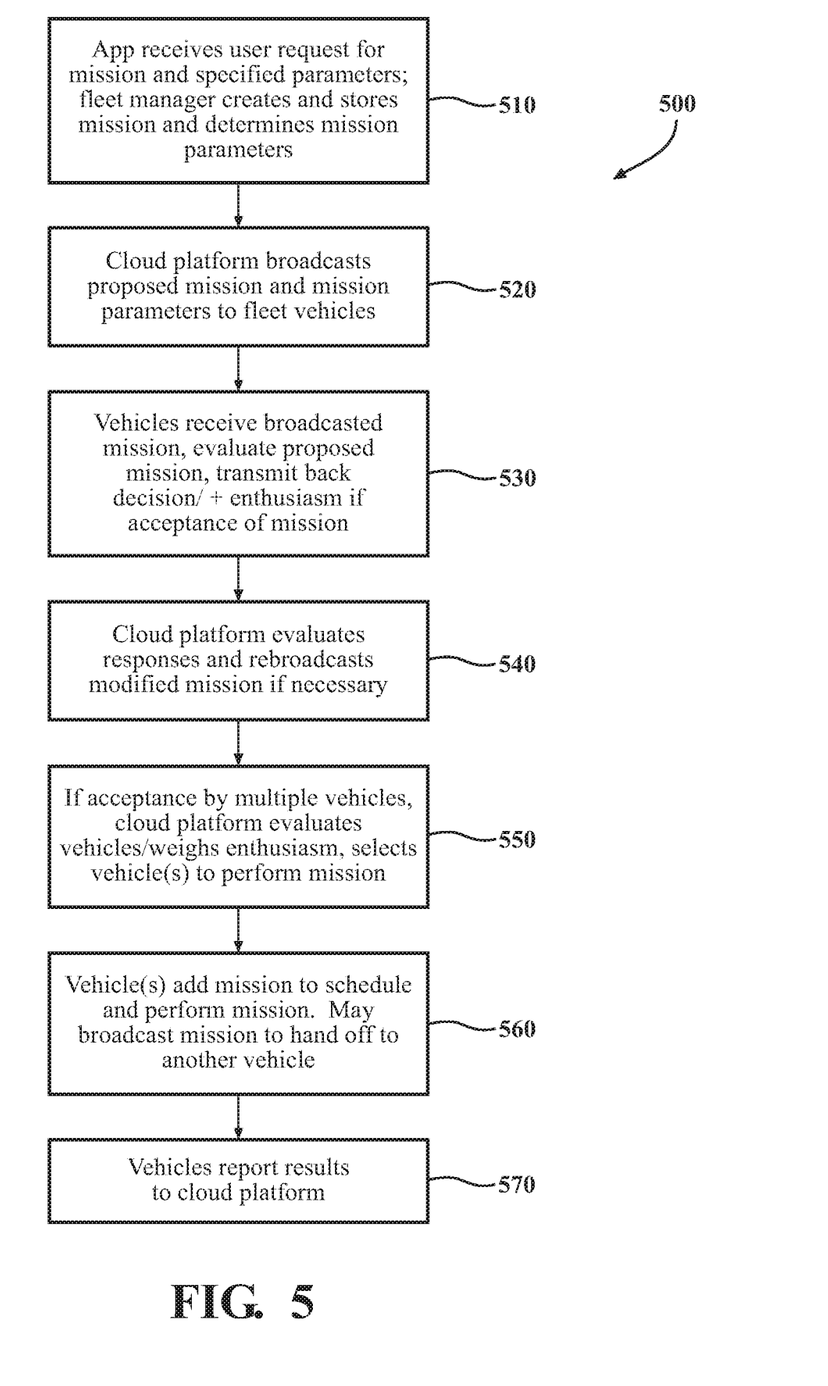
FIG. 5 depicts an exemplary process for the exemplary system depicted in FIG. 1.
Figure 6A:
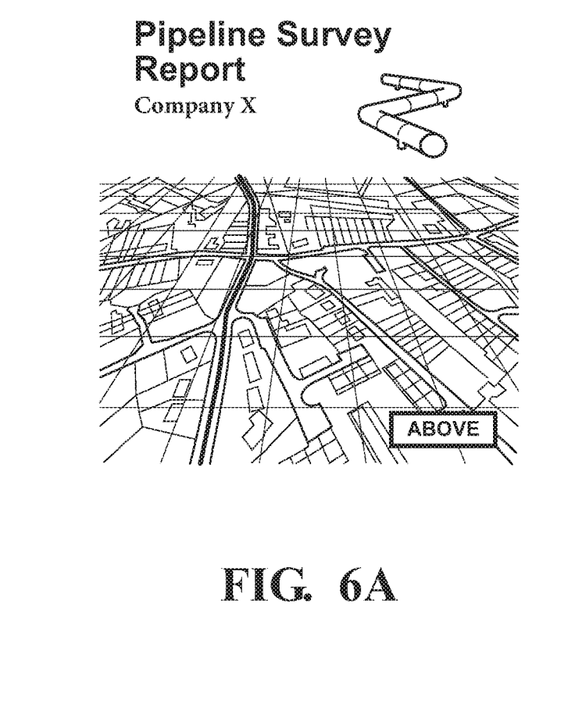
FIGS. 6a-f depict example reports and analytics provided to an end user requesting a mission.
Figure 6B:
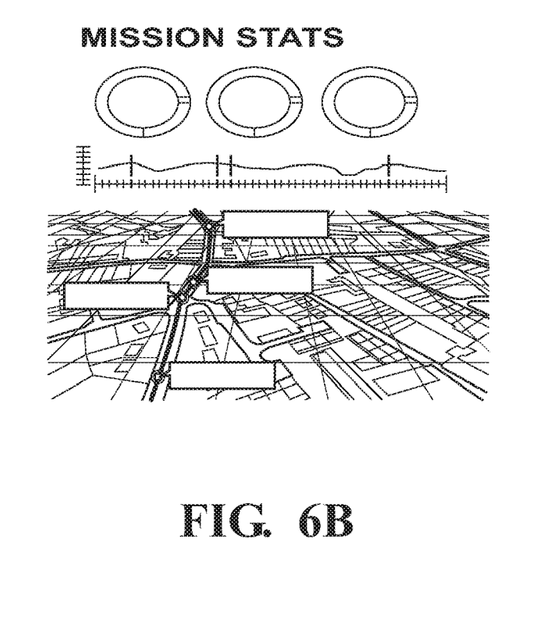
Figure 6C:
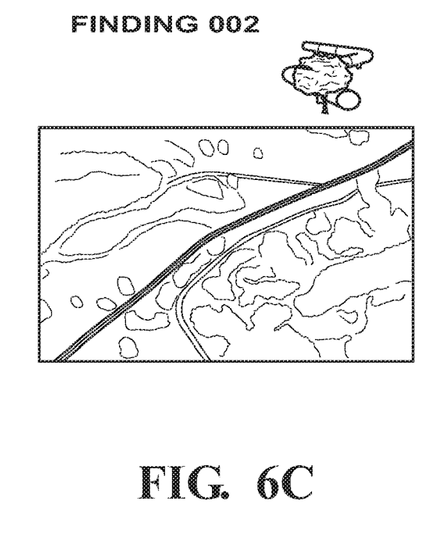
Figure 6D:
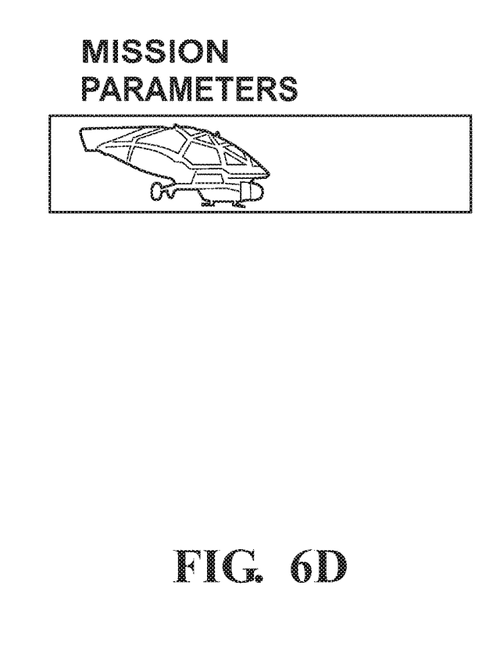
Figure 6E:
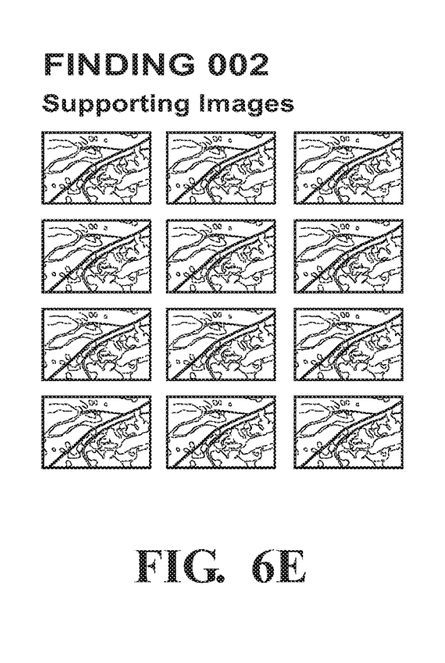
Figure 6F:
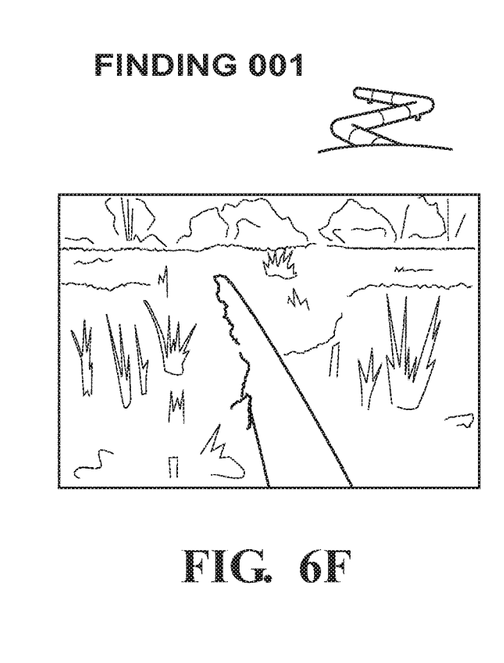

In embodiments, with reference to FIG. 5, a workflow of an exemplary system 100 relating to a mission may include the following steps. At a step 510, an end-user may interact with the application 244 of the cloud platform, such as via a user application interface on user device 140, which may communicate with the fleet manager 122 for configuring and requesting a mission. The end user may specify the parameters of the mission via the user interface. The fleet manager 122 creates and stores the mission and its associated parameters.

At a step 520, the cloud platform broadcasts the mission to the vehicle fleet. The cloud platform may or may not exclude vehicles where the probability is too low that the vehicle will accept the mission (such as due to the location of the vehicle or lack of appropriate sensors for the mission). At a step 530, the vehicles may receive and acknowledge receipt of the mission and its parameters, each vehicle may analyze the mission and choose whether it will accept the mission, and may transmit back its decision or only transmit back an affirmative decision. The vehicles may send acceptance of the mission with a weighted level of interest representing enthusiasm for the mission or portion of the mission.

At a step 540, the cloud platform may evaluate responses to the broadcast mission request. If no vehicles have accepted the mission, then an updated mission may be sent. For example, if a scheduled complete date associated with the mission is determined to be a reason why no vehicles accepted the mission, then the mission schedule can be modified and rebroadcast. At step 550, if more than one vehicle has accepted the mission or a particular segmented portion of the mission, the system will evaluate the vehicles and/or weigh the enthusiasm of the vehicles with respect to one another and select one vehicle over the other based on the weighted value of the interest sent by the vehicle. The cloud platform may then communicate with the vehicles regarding assignments for the mission. In embodiments, the vehicles may self-select a mission or a part thereof without needing confirmation or approval of the fleet manager.

At a step 560, a vehicle that accepts the mission or a segment of the mission may add the mission to their schedule and conduct the mission. A vehicle may rebroadcast the mission or mission segment and handoff the mission or mission segment to another vehicle. At a step 560, all vehicles involved in the mission may deliver the mission results to the cloud platform.

In embodiments, each vehicle 210A, 210B may need to have a minimum set of requirements to be a part of the system 100. For example, these requirements may include: an ability to receive a mission plan from the fleet manager, an ability to maintain its own schedule, an ability to evaluate mission criteria and compare it to current abilities to develop a confidence and enthusiasm level for task performance, an ability to communicate regarding capabilities of various components of the vehicle, such as robots, sensors, a sensor array, and capabilities of the vehicle itself, such as speed, loiter ability, altitude capabilities, or the like. Additional factors may include an ability to request and receive external data such as weather conditions, air map, ATC, or the like, an ability to evaluate, determine enthusiasm for, and accept a mission. Enthusiasm may relate a percentage of fit for the mission by evaluating whether the vehicle and its robot can meet all of the specifics of the mission including sensor array, schedule, or the like. Other factors include an ability to communicate acceptance or rejection of the mission to the fleet manager, and an ability to rebroadcast the mission or parts of the mission if conditions change for all or part of the mission and/or the vehicle's enthusiasm otherwise decreases or capabilities decrease.

In the process of selecting vehicles for various tasks of a mission, it may be important to determine, based on a number of factors, the capabilities of a specific vehicle/robot to complete the tasks. Onboard parameters for vehicle proficiency and enthusiasm may include such parameters as vehicle identification, physical attributes (max speed, max payload, and the like), physical dimensions, sensor payload components and specifications, terrain travel and movement restrictions for mission, current availability, power requirements, overall efficiency for mission, material handling, HAZMAT (hazardous materials) capabilities, computing systems, operating system, communication protocols supported, amount of onboard storage available, and the like.

Some vehicles may natively be better suited for certain tasks, therefore, each variable may be weighted and embedded in a vehicle mission proficiency prediction model, which may allow the system to be capable of learning to predict the best model suited for any particular mission. Selection for a mission or inclusion of a vehicle in a mission offering may be affected based on a vehicle having a sufficient measure of enthusiasm for one or more tasks making up the mission. The output of the proficiency prediction model may aid in the measure of vehicle enthusiasm. However, in a fleet of various vehicles integrated with the fleet manager, promotional factors ranging from accuracy priority, research priority, prioritized exposure of features and others may all impact the overall enthusiasm. Therefore, a final enthusiasm model may fuse both the intrinsic vehicle enthusiasm represented by vehicle capability, and an external enthusiasm, represented as the fleet manager decision priorities regardless of the vehicle's capabilities.

Furthermore, each vehicle in the field may continuously capture large data that can be input as training sets to one or more learning models of the cloud platform. Each vehicle may also experience and analyze different environments due to the spatial distribution of the organized fleet. The vehicles can share trained skillsets, as well as deploy processed models from the Fleet Manager. The system then may have an increased confidence for producing consistent results from one vehicle to another, as many will be carrying similar hardware and vehicle specifications. The system may merge processed inference models to accelerate learning for an increased robustness throughout the fleet.

The aerial autonomous vehicles of the system may be tasked in accordance to proximity to task, weather, wind patterns, and optimal route outputs. Routes may be optimized through standard search algorithms, however, and may be integrated with weights respective to external variables, such as wind or bad weather or the like. Various fused occupancy maps representing different architypes of vehicle obstacles are represented different from one another to more accurately predict the impact each obstacle has on any particular vehicle. For instance, weather is a gradual forcing impact, and may then best be represented mathematically as a gradient. A gradient may be represented by a mathematical formula or relationship, possibly similar to those modeling attraction between particles or magnetic forces. Legal regulation may also be modeled as a gradient. Geographic factors, such as city limits, private lands, no-fly zones and the like as well as temporal factors, such as a scheduled public event and the like that may be fully characterized in time and/or space that should not be included in the flight zone may simply be represented in a route optimization process as a discretized obstacle with no gradual impact.

Optimized routes allow for efficient segmentation of missions. The fleet manager may continuously analyze and learn from the travel time, course error, prediction error, and unexpected events, which may be communicated from the vehicles, to continuously improve scheduling and segmentation of tasks. A nodal network for weighting the output of each the vehicles proposed, and actual routes can provide insight into errors, such that the system can be learned from and improved over time. Each vehicle, especially those having the same physical capabilities and form, can share data for learning to occur at a faster rate. This may be possible and enabled via an integrated V2V communication protocol.

The system's vehicle to vehicle communication capabilities may enable coordinating functions between vehicles for in-depth monitoring, high precision localization, increased perception confidence, decreased navigation uncertainty, and increased mission endurance. Each vehicle may act as an access point, setup as a secured tray of information for sharing. An access point may be limited to only be accessible to the vehicles and certain system technicians. An access point may enable two way communication between vehicles at a high bandwidth and frequency, such as via high power 5 GHz communication or other protocols.

A combination of both short, high speed and longer, slower range communications including radio, and network accessibility, carries many advantages from multi-hopping network accessibility for remote missions communications and range extenders, collaborative coordination for simultaneous mission data capture, and for sharing data sets for both learning and processing application. This communication selection is autonomously operated by an onboard transmission manager of the vehicle. Short range mode of operation enables real-time mission coordination, while the longer range mode focuses on the fleet and centralized manager's status.

When in short, high speed V2V communication mode, a vehicle may have the capabilities to not only collect and store data from sensors, but also act as a IOT device. A vehicle may carry remote sensing hardware to localize itself and detected obstacles. Generated vehicle occupancy and meta data maps can be shared with other vehicles in real-time. This communication enables an increased perception of the surrounding environment which may improve the success of autonomous navigation. In examples, the shared localization data provides an increased confidence and varying perspective. The added functionality of close proximity and high speed V2V communication enables a connected vehicle model. Further autonomy is enabled through the generation of a virtual environment through multiple vehicle's fused perspectives.

In embodiments, while most mission tasking and data transfers will flow between an airborne vehicle and the cloud platform, the vehicle may also have the capability to share data between autonomous vehicles in the field. This communication carries many advantages from multi-hopping network accessibility for remote mission communications and range extenders, collaborative coordination for simultaneous mission data capture, and for sharing data sets for both learning and processing applications.

In embodiments, the system may share training data sets and perform inference merging. Each vehicle in the field may continuously capture large data sets that can be input as training sets to learning models. Each vehicle may also experience and analyze different environments due to a spatial distribution of the organized fleet. Vehicles may be enabled to share trained skillsets, as well as deploy processed models from the centralized server 120. This may provide an increased confidence that consistent results can be produced from one vehicle to another, as many vehicles may be similar to each other in terms of similar hardware and vehicle specifications. The system 100 may be enabled to merge processed inference models to accelerate learning for an increased robustness throughout the fleet.

In embodiments, the uniqueness of the aerial vehicle system includes its ability to use artificial intelligence AI to sense an issue during a mission. This sensing can trigger automated path planning to create a more in-depth look at the suspected issue site. This is an issue detailed examination (IDE) procedure which entails planning a path (such as a circular path around the site) to acquire more data regarding the sensed issue. The acquired data from the sensors may be processed to determine if the issue is a real issue and/or determine a magnitude or extent of the issue, or the like. The acquired data and/or the processed data may be stored for the purpose of documenting an issue, and reports may be generated to produce auto-generated, complied outputs for an end user. For example, if an issue is determined not to exist, the data captured during IDE procedure may be sent to a customer requesting the mission as part of a mission report. In embodiments, the system may prioritize sending data for IDE procedures depending on the nature of the application, such as for electric corridor and pipeline missions, or the like, wherein timeliness of issue reporting may be deemed to be important, such as by a set of mission parameters and/or data captured through a user interface application 144 and the like. The data may be stored by the system 100 as an exportable multi-dimensional dataset (e.g., spatiotemporal data and the like) as well as in a formatted documented format (e.g., Portable Document Format (PDF) and the like that may be used for official auditing purposes. In embodiments, the reports may be automatically formatted for certain layout concepts such as those shown in FIGS. 6a-6f.

In embodiments, each vehicle may be outfitted with the necessary sensors to determine the state of each subsystem. Furthermore, signal identification algorithms enable flagging of inconsistencies in operations. These incidents are logged and communicated amongst the fleet in order to maintain continuous mission services for customers. In this manner, vehicle service logs may be automated.

In embodiments, the system 100 and vehicles 210A, 210B and the like may be enabled to not only detect malfunctions, but also monitor wear and predict service life spans and maintenance requirements. This service life monitoring and shared data amongst vehicles enable expedited learning of the vehicles' intrinsic wear.

In embodiments, maintenance is not only coordinated amongst vehicles of the fleet but may also be coordinated with the proximity and route of field engineers. These algorithms enable optimized downtime for each vehicle, and maximized maintenance time with workers in the field.

In embodiments, navigation and motion systems of the vehicles may be improved, such as in cases of redundant motor configurations, where shared control and a proprietary switching circuit enables redundant flight configurations, and a use case where wind power can be utilized. Without these technological innovations, vehicle flight control technology was generally limited to functionalities for active throttling, regenerative braking, and 3D modes. Along with a switching circuit, the vehicle power system can have modes for wind harvesting for energy generation, and in the case of current surfing, braked flight control, such as by passively braking one or more rotors to affect the direction of motion. The symmetrical motor configuration gives the vehicle the ability to have vertical takeoffs, as well as reorient itself in cases of losing lifting gas, for a more controlled descent.

In embodiments, vehicles may have an energy management system. Due to a large power distribution system, the vehicles may have isolated power systems that may operate individually. While there may be built in redundancies and fail safes, a battery management system may be capable of monitoring the state of each battery, and switching its mode (i.e. charging/discharging). This subsystem may be capable of individually monitoring two or more batteries per motor, along with providing the power reserved for the payload and vehicle flight utilities. In embodiments, batteries for a first rotor may be operating in a recharge state that may facilitate collecting air currents with the first rotor acting as a wind-powered generator while batteries for a second rotor may be discharging to power the second rotor.

The methods and systems described herein may be deployed in part or in whole through a machine that executes computer software, program codes, and/or instructions on a processor. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable transitory and/or non-transitory media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, all the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable transitory and/or non-transitory media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, all the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable transitory and/or non-transitory media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable transitory and/or non-transitory media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having AI, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the disclosure has been disclosed in connection with the preferred embodiments shown and described in detail, various modifications and improvements thereon will become readily apparent to those skilled in the art. Accordingly, the spirit and scope of the present disclosure is not to be limited by the foregoing examples, but is to be understood in the broadest sense allowable by law.

What is claimed is:

1. A method for planning and executing missions, the method comprising:
    receiving, by a fleet manager, a mission request from an end user;
    determining, by the fleet manager in response to receipt of a mission request, a mission plan having a corresponding mission path and corresponding mission tasks;
    determining, by the fleet manager, one or more vehicles of a fleet of aerial autonomous vehicles to perform the corresponding mission tasks, wherein the mission path and mission tasks are divided into segments performed by different vehicles of the fleet; and
    coordinating, by the fleet manager, the determined one or more vehicles to perform the corresponding mission tasks, wherein the determined one or more vehicles for performing the corresponding mission path are enabled to acquire digital 2D data corresponding to a vehicle occupancy map, and analyze the acquired digital 2D data to detect incidents relating to the mission which require a change in a mission path;
    wherein:
        the vehicle occupancy map contains data representing one or more distinct architypes of vehicle obstacles; and
        at least one of the one or more distinct architypes of vehicle obstacles corresponds to a temporal factor.

2. The method of claim 1, further comprising:
    broadcasting, by the fleet manager, the mission plan to each vehicle of the fleet; and
    receiving, by the fleet manager, a corresponding communication from each of at least some vehicles of the fleet indicating an ability of the vehicle to perform one or more mission tasks of the mission, wherein a selecting step is performed to determine the vehicles to perform the corresponding mission tasks based on the corresponding communications.

3. The method of claim 2, wherein the corresponding communication from each of at least some vehicles of the fleet represent an enthusiasm of the vehicle to perform the one or more mission tasks.

4. The method of claim 1, wherein at least one of the one or more distinct architypes of vehicle obstacles is a gradient corresponding to a legal regulation.

5. A method for planning and executing missions, the method comprising:
    receiving, by a fleet manager, a mission request from an end user;
    determining, by the fleet manager in response to receipt of a mission request, a mission plan having a corresponding mission path and corresponding mission tasks;
    broadcasting, by the fleet manager, the mission plan to each vehicle of the fleet;
    receiving, by the fleet manager, a corresponding communication from each of at least some vehicles of the fleet indicating an ability of the vehicle to perform one or more mission tasks of the mission, wherein the corresponding communication from each of at least some vehicles of the fleet represent an enthusiasm of the vehicle to perform the one or more mission tasks;
    selecting, by the fleet manager, one or more vehicles of a fleet of aerial autonomous vehicles to perform the corresponding mission tasks, wherein the mission path and mission tasks are divided into segments performed by different vehicles of the fleet; wherein the selecting step is performed to determine the vehicles to perform the corresponding mission tasks based on the corresponding communications and a vehicle occupancy map; and
    coordinating, by the fleet manager, the selected one or more vehicles to perform the corresponding mission tasks;
    wherein:
        the vehicle occupancy map contains data representing one or more distinct architypes of vehicle obstacles; and
        at least one of the one or more distinct architypes of vehicle obstacles is a gradient corresponding to a legal regulation.

6. The method of claim 5, wherein the determined one or more vehicles for performing the corresponding mission path are enabled to acquire digital 2D data corresponding to a flight path, analyze the acquired digital 2D data to detect incidents relating to the mission which require a change in a mission path.

7. The method of claim 5, wherein the selected one or more vehicles are enabled to detect incidents relating to the mission which require additional data acquisition.

8. The method of claim 5, wherein the selected one or more vehicles are enabled to perform edge processing.

9. The method of claim 8, further comprising reducing, by one of the selected one or more vehicles, an acquired data set, and transmitting a resultant reduced data set to a cloud platform.

10. The method of claim 9, further wherein the cloud platform transmits the resultant reduced data set to an end user.

11. The method of claim 9, wherein the one of the selected one or more vehicles determines an amount, a selected channel over which to transmit the resultant reduced data set to the cloud platform, and a timing for the transmission.

12. The method of claim 5, wherein one of the selected one or more vehicles communicates with another vehicle of the fleet to offload a mission task to the another vehicle.

13. The method of claim 5, wherein the selected one or more vehicles are enabled to detect incidents relating to the mission which require additional data acquisition using a neural network.

14. The method of claim 13, further comprising capturing images by the selected one or more vehicles, analyzing the captured images to detect an event indicative of a need for additional information, adjusting a path of the vehicle to facilitate capture of images from a plurality of perspectives of the detected event, and capturing additional images, wherein a controller of the vehicle performs the analyzing and adjusting.

15. The method of claim 5, wherein at least one of the one or more distinct architypes of vehicle obstacles corresponds to a temporal factor.

16. A method for operating a plurality of autonomous flight vehicles, the method comprising:
    receiving, by an autonomous flight vehicle fleet manager, a mission request from an end user, the mission request including at least one mission objective;
    determining, by the fleet manager in response to receipt of a mission request, a mission plan having a corresponding mission path and corresponding mission tasks, the mission plan being determined based on autonomous flight vehicle information from a vehicle occupancy map, the autonomous flight vehicle information including data descriptive of a plurality of vehicle capabilities;
    selecting, by the fleet manager, one or more candidate vehicles of a fleet of vehicles to perform at least one of the corresponding mission tasks, wherein at least one vehicle capability of the one or more candidate vehicles corresponds to a capability requirement determined from the mission request; and
    coordinating operation of the selected one or more vehicles for a duration of the mission request, thereby fulfilling the at least one mission objective of the mission request;
    wherein:
        the vehicle occupancy map contains data representing one or more distinct architypes of vehicle obstacles; and
        at least one of the one or more distinct architypes of vehicle obstacles corresponds to a temporal factor.

17. The method of claim 16, wherein at least one of the one or more distinct architypes of vehicle obstacles corresponds to weather.

18. The method of claim 16, wherein at least one of the one or more distinct architypes of vehicle obstacles corresponds to a legal regulation.

19. The method of claim 18, wherein the at least one distinct architype of vehicle obstacles is a gradient corresponding to the legal regulation.

20. The method of claim 16, wherein at least one of the one or more distinct architypes of vehicle obstacles corresponds to a geographic factor.

* * * * *